United States Patent
Kuharevicz et al.

(10) Patent No.: US 6,705,461 B2
(45) Date of Patent: Mar. 16, 2004

(54) MODULAR CONVEYOR WITH RADIUS TURN MODULE AND METHOD OF ASSEMBLY

(75) Inventors: Paul Kuharevicz, Muskegon, MI (US); Curtis Chambers, Muskegon, MI (US); Cory Slotman, Hamilton, MI (US); Daughn Majeski, Muskegon, MI (US)

(73) Assignee: Dynamic Conveyor Corporation, Muskegon, MI (US)

( * ) Notice: Subject to any disclaimer, the term of this patent is extended or adjusted under 35 U.S.C. 154(b) by 45 days.

(21) Appl. No.: 10/031,667
(22) PCT Filed: Jun. 15, 2001
(86) PCT No.: PCT/US01/19194
§ 371 (c)(1),
(2), (4) Date: Jan. 18, 2002
(87) PCT Pub. No.: WO01/96216
PCT Pub. Date: Dec. 20, 2001

(65) Prior Publication Data
US 2002/0125110 A1 Sep. 12, 2002

Related U.S. Application Data
(60) Provisional application No. 60/211,745, filed on Jun. 15, 2000.

(51) Int. Cl.[7] ............................................. B65G 21/08
(52) U.S. Cl. ............................... 198/861.1; 198/861.2; 198/831
(58) Field of Search .............................. 198/831, 860.1, 198/861.1, 861.2

(56) References Cited

U.S. PATENT DOCUMENTS

| | | | |
|---|---|---|---|
| 3,707,218 A | | 12/1972 | Payne et al. |
| 3,920,115 A | * | 11/1975 | Craggs ................... 198/861.1 |
| 4,144,965 A | * | 3/1979 | Alldredge et al. ....... 198/861.1 |
| 4,738,354 A | | 4/1988 | Frei |
| 4,961,492 A | * | 10/1990 | Wiseman et al. ..... 198/861.1 X |
| 5,163,545 A | | 11/1992 | David |
| 6,032,781 A | | 3/2000 | Ballestrazzi et al. |

FOREIGN PATENT DOCUMENTS

JP 3-195616 * 8/1991 .............. 198/861.1

* cited by examiner

Primary Examiner—James R. Bidwell
(74) Attorney, Agent, or Firm—McGarry Bair PC

(57) ABSTRACT

A modular conveyor system (10) comprising multiple modules, such as a straight module (18), a powered module (20), a return module (23), and a radius turn module (22). The modules can be directly connected or connected by one or more connection assemblies (26). The radius turn module includes bendable side walls (131) that can be combined or cut as needed to obtain the desired angle of turn.

53 Claims, 7 Drawing Sheets

MODULAR CONVEYOR WITH RADIUS TURN MODULE AND METHOD OF ASSEMBLY

RELATED APPLICATION

This application claims priority on International Application No. PCT/US01/19194, filed Jun. 15, 2001, which claims priority on U.S. Provisional Application No. 60/211,745, filed Jun. 15, 2000.

BACKGROUND OF THE INVENTION

1. Field of the Invention

This invention relates to modular conveyors. In one of its aspects, the invention relates to a conveyor which is formed by joining modules end-to-end. In another of its aspects, the invention relates to a modular conveyor with radius turn modules. In yet another aspect, the invention relates to a method of assembling the radius turn module.

2. Related Art

Conveyor systems are commonly used for a variety of applications. Illustrative applications are: manufacturing facilities, assembly facilities, inventory distribution centers, and parcel or package distribution systems. Typically, suitable conveyor systems are either modular conveyor systems or made-to-order or custom conveyor systems.

Modular conveyors are commonly used in moving relatively low weight products or materials from one work area to another. A common environment for a modular conveyor is a molding environment where the modular conveyor carries the molded article from a molding operation to either a finishing, assembly or packaging center.

Chambers U.S. Pat. No. 5,131,531, which is incorporated by reference, discloses a modular conveyor formed by a series of modules, including a drive module, a straight module and an end module connected by various connectors that can maintain or change the elevation of the modules. The modules are supported above a floor by leg supports and define a frame about which a conveyor belt is supported. The conveyor belt is typically an endless belt.

One important advantage of the modular conveyor system is that the conveyor modules can be selected without the need for pre-assembly prior to shipping the conveyor to its ultimate destination, which dramatically reduces the assembly costs. Another advantage is that the modular conveyor is shipped unassembled in a relatively small container, which dramatically reduces the shipping cost. The modular nature of the pieces forming the modular conveyor lends the conveyor pieces to be made by any suitable molding process, negating the need for special tools to form or cut the pieces.

To effect a turn with the Chambers '531 patent, two straight sections of the modular conveyor were angularly arranged, typically orthogonal to each other, and a deflecting bar, which can be curved or straight, was mounted between the adjacent side walls of the conveyors. Articles carried by the first conveyor contacted the deflecting bar and were subsequently deflected and/or pushed onto the second conveyor by the continued movement of the first conveyor alone or in combination with contact from subsequent articles on the first conveyor.

While satisfactory, the use of multiple conveyors in combination with a deflector to effect a turn was disadvantageous because the deflector inherently reduced the width of the conveyor along the turn and the articles carried by the conveyors typically did not maintain their initial spatial relationship as they piled up at the deflector, which is very important in some situations, especially timed assembly lines. The use of separate conveyors inherently required separate conveyor belts and separate drive systems all of which increased the complexity and cost of the conveyor.

Custom conveyors have the advantage that an exact conveyor shape can be made. One advantage of these systems is that a radius turn, e.g. a turn with a continuous arc, could be custom made, eliminating the need for a deflector. The radius turn also has the advantage of keeping the spacing of the articles carried by the conveyor. The flexibility in conveyor shape comes at substantially increased cost and complexity for the custom conveyors.

Since a majority of the pieces forming a custom conveyor must be specifically or individually made for a given conveyor, the custom conveyors tend to cost substantially more than the modular conveyors. The need for unique size pieces leads custom conveyors to be made from metal, instead of molded plastic elements as with the modular conveyors. The uniqueness of each design also requires that the conveyors be assembled and tested prior to shipping to their final destination. Often times, the assembled and tested custom conveyor must be partially or completely disassembled for shipping to the end destination. The shipping costs are also typically more expensive than the modular conveyors because of the unique sizes of many pieces of the custom conveyor.

Stand-alone radius turn assemblies are available and are typically used with custom conveyor systems. The stand-alone radius turn assemblies are made with a custom metal frame like the custom conveyors. Since these radius turn assemblies are stand-alone, they necessarily require their own belt or roller system and a corresponding drive mechanism, typically in the form of an electric motor, which disadvantageously increases their cost and complexity.

There is still a need for a modular conveyor that includes a modular radius turn, preferably made with modular components, to avoid the reduced volume and article stack-up encountered with the prior deflector-effected turns. A preferred modular conveyor may reap the manufacturing, assembling and shipping benefits of the modular components and would avoid, the disadvantages attendant the custom conveyors.

SUMMARY OF THE INVENTION

A conveyor assembly comprises a plurality of modular assemblies, each of which comprises a pair of side walls, cross members, and belt support. Fastener assemblies are provided for joining the modular assemblies to each other to form an assembled conveyor frame with the defined belt path. An endless conveyor belt having a length to fit in the defined belt path is also provided. According to the invention, at least one of the modular assemblies has sided walls that are bendable through an arc about an axis perpendicular to the belt path to define at least one radius turn of the belt path.

Preferably, the bendable side walls comprise a plurality of ribs positioned on the side walls to resist bending other than about the bending axis. The bendable side walls have opposing inner and outer surfaces connected by a peripheral edge. The inner surface faces the belt path when the conveyor frame is assembled and the ribs extend from the outer surface. The ribs are preferably spaced relative to each other along the side walls. A reduced thickness portion is formed in the side walls between at least some of the adjacent ribs for use in guiding the cutting of the side walls to adjust the length thereof. Preferably, the ribs are generally orthogonal to the longitudinal axis.

The bendable side walls can further comprise an embossment having an opening, with the embossment forming part of the fastener assembly. The embossment opening is preferably tapped and the fastener assemblies further comprise a plate for spanning between the embossment and the adjacent side wall. A threaded fastener can be received through an opening in the plate and threaded into the tapped opening to secure the plate to the adjacent side wall. The tapped opening can be formed by a threaded nut or the like that is received within the embossment opening. The embossments are preferably integrally formed with the side wall.

The conveyor assembly can further comprise a plurality of modular connectors for joining the modular assemblies end-to-end. The modular connectors preferably include side walls, cross members and belt supports. The modular connectors can be straight connectors or angular connectors. Preferably, the sum of the lineal length of the upper and lower edges of the side walls for the modular connectors are equal.

The at least one curve section preferably comprises an inner wall formed by the bendable side wall and defining an inner arc, and an outer wall formed by another bendable side wall and defining an outer arc. The outer arc has a radius of curvature greater than the inner arc. The side walls forming the inner wall and the outer wall preferably have a uniform length. One or both of the side walls forming the inner or outer wall can be cut to length to obtain the desired arc.

The modular assemblies can further comprise at least one of a motor assembly, a straight assembly, and a belt return assembly.

In another embodiment, the invention comprises a conveyor comprising a plurality of modular assemblies, each of which has a pair of spaced side walls, a cross member connecting the spaced side walls, and a belt support mounted on the cross member and forming at least a portion of a belt platform. Fastener assemblies join the modular assemblies to each other to form an assembled conveyor frame with a defined belt path. An endless conveyor belt is disposed within the belt path and is supported by the belt supports. At least one of the modular assemblies has bendable side walls bent through an arc about an axis perpendicular to the belt path to define at least one radius turn of the belt path.

The bendable side walls preferably have a longitudinal axis that is generally parallel to the belt path. A plurality of ribs can be positioned on the bendable side wall to resist bending about the longitudinal axis. The bendable side walls have opposing inner and outer surfaces connected by a peripheral edge. Preferably, the inner surface faces the belt path and the ribs extending from the outer surface. The ribs are preferably spaced relative to each other along the side wall. The side walls can have a reduced thickness portion located between the ribs for use in guiding the cutting of the side walls to adjust the length thereof. The ribs are preferably orthogonal to the longitudinal axis.

The bendable side walls can further comprise an embossment having an opening. The embossment can form part of the fastener assembly. Preferably, the embossment opening is tapped and the fastener assembly further comprises a plate spanning between the embossment and an adjacent side wall in combination with a threaded fastener received through an opening in the plate and threaded into the tapped opening to secure the plate to the bendable side wall. A threaded nut can be fixedly mounted within the embossment opening to form the tapped opening. At least one of the embossments is preferably integrally molded with the bendable side wall.

The conveyor can further comprise a plurality of modular connectors that join the modular assemblies end-to-end. The modular connectors preferably comprise side walls, cross members and belt supports. The modular connectors preferably comprise a straight connector or an angular connector.

The at least one radius turn preferably comprises an inner wall and an outer wall. Both the inner wall and outer wall are formed by at least one bendable side wall. The inner wall defines an inner arc and the outer wall defines an outer arc, which has a radius of curvature greater than the inner arc. The bendable side walls forming the inner wall and the outer wall initially are of a uniform length. At least one of the bendable side walls can be cut to a length less than the uniform length. At least one of the inner and outer walls is formed by multiple bendable side walls.

The endless conveyor belt is preferably formed from a single belt that contains the entire belt path. The modular assemblies can further comprise at least one of a motor assembly, a straight assembly, or a belt return assembly.

In yet another embodiment of the invention, a method for assembling a conveyor of modular assemblies into a conveyor with an endless belt path including a radius turn thereof, each of which modular assemblies comprises a pair of spaced side walls, a cross member connecting the spaced side walls, and a belt support mounted on the cross member and forming at least a portion of a belt platform, comprising the steps of bending the side walls through an arc about an axis perpendicular to the belt path to define at least one radius turn of the belt path. Further, the method includes the step of cutting the side walls to conform with the modular nature of the remaining modular assemblies. The method further comprises the step of assembling the modular assemblies together at facing edges thereof.

The a modular conveyor according to the invention includes a modular radius turn, preferably made with modular components, to avoid the reduced volume and article stack-up encountered with the prior deflector-effected turns. The modular conveyor according to the invention further reaps the manufacturing, assembling and shipping benefits of the modular components and avoids the disadvantages attendant the custom conveyors.

DETAILED DESCRIPTION OF THE DRAWINGS

Figure 1:
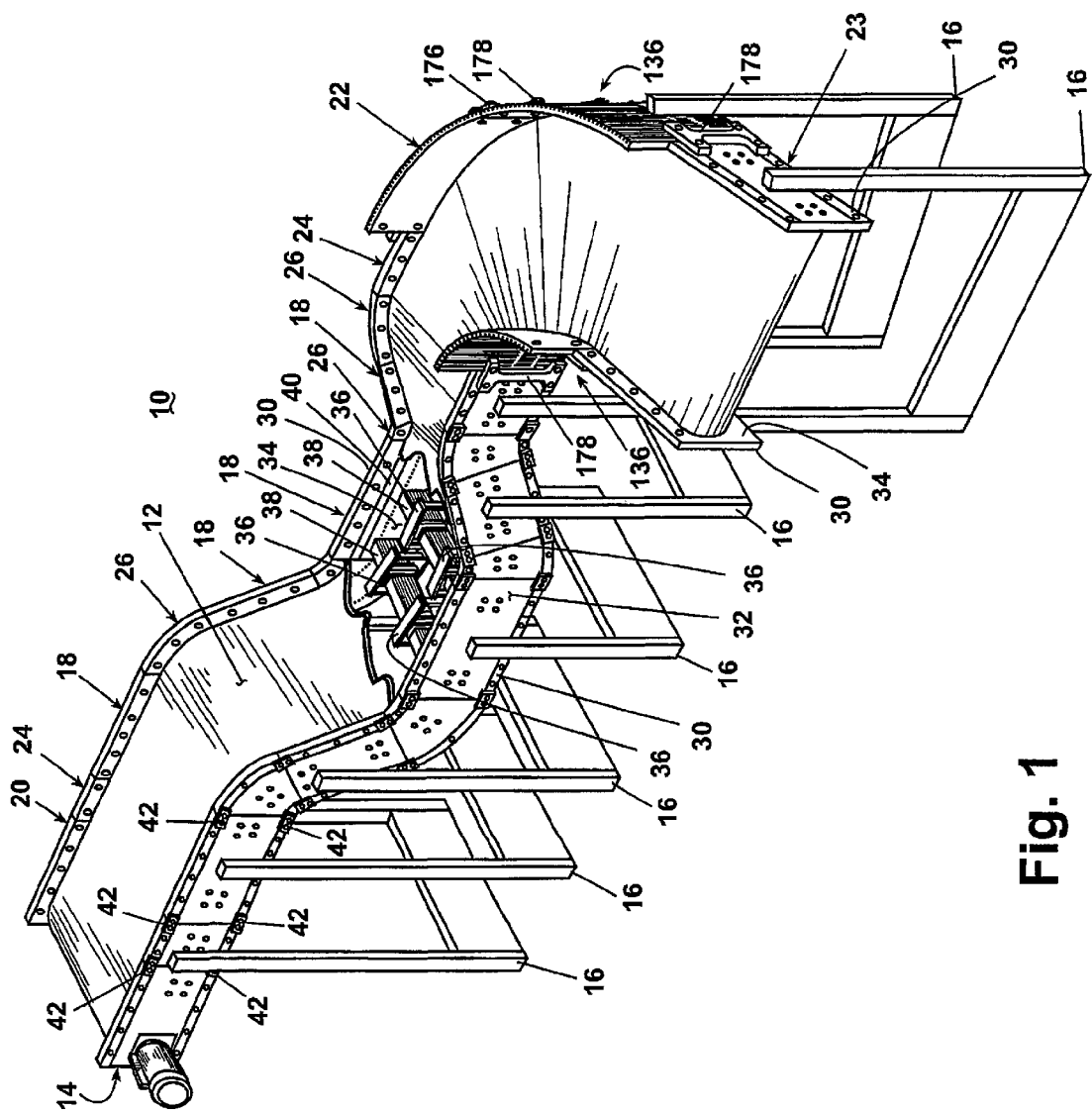
FIG. 1 is a perspective view of a portion of a modular conveyor with a radius turn module according to the invention.

Referring now to the drawings and to FIG. 1 in particular, a partial modular conveyor 10 according to the invention is shown in one illustrative example of a possible configuration. The conveyor 10 can be arranged in an unlimited number of different configurations in practice. The conveyor comprises a conveyor belt 12 carried by a frame 14, which is supported above a floor by multiple support members 16. The particular construction of each support member 16 is not a crucial aspect of the invention, and different means for supporting the conveyor can be used. For instance, the support members 16 can be mounted on wheels for easy transport of the conveyor from place to place. The support members can also be fixed to a floor surface. The support members can also include supports suspended from a ceiling when the conveyor is used in an overhead environment. In short, the shape, size, and type of support can vary greatly depending on the particular conveyor application.

A preferred embodiment of the frame 14 comprises multiple modules: a straight module 18, a powered module 20, and a radius turn module 22, and a belt return or end module 23, all of which can be connected by a combination of straight connector assemblies 24 or angular connector assemblies 26.

The angular connector assemblies 26 change the elevation of the conveyor belt 12 with respect to the horizontal. For instance, the angular connector assemblies 26 can be used to provide a conveyor having a horizontal conveying section at one height and a different horizontal conveying section at a different height. Each angular connector assembly 26 can be oriented downwardly or upwardly. Each angular connector assembly 26 can be rotated approximately 180° before connecting it to the remainder of the frame to direct the conveyor in an upward direction or a downward direction. The angular connector assemblies 26 can be constructed to form various angles. For example, by providing an angular connector assembly with an arc of 30° and an angular connector assembly with an arc of 45°, great flexibility in constructing a conveyor system can be achieved.

A general description of the conveyor 10 is useful in understanding its modularity. Each of the modules and the connector assemblies have the same basic structure comprising opposing side walls that are connected by cross members, which support multiple belt supports on which the belt 12 is carried. Adjacent modules are connected by fastening assemblies that span adjacent side walls. The side walls have an upper and lower edge. Preferably, both the straight and the angular connectors are configured such that the sum of the lineal distance for the upper and lower edges of the side walls are equal, which permits the swapping of one connector for another without requiring a resizing of the conveyor belt 12.

The modules, connectors and fastening assemblies essentially form the principle building blocks of the modular conveyor 10. The adjacent modules and connector assemblies are fastened together by the fastening assemblies. The side walls of each module and connector, the cross members, and the belt supports all form the frame for supporting the belt and retaining objects on the belt as it moves.

It should be noted that while the connectors are preferably used to connect adjacent modules, that it is within the scope of the invention for the various modules to be connected directly, without any intervening connector assemblies 26.

The assembled modules and any connectors form the conveyor frame, which defines a belt path. The conveyor belt is mounted to the conveyor frame and moves along the belt path. Preferably, the conveyor belt is an endless belt that is trained about the defined belt path.

All of the modules (except for the radius turn module 22), connectors, and fastening assemblies are described in detail in U.S. Pat. No. 5,131,531 to Chambers, which is incorporated herein by reference. The current inventive conveyor with its radius turn module 22 is an improvement of the conveyor disclosed in U.S. Pat. No. 5,131,531. Therefore, the modules, connectors and fastening assemblies will only be briefly described.

The straight module 18 comprises a pair of opposing straight and opposing side walls 30 having exterior surfaces 32 and interior surfaces 34, a pair of opposing belt supports 36, and a transversely extending cross member 38. Belt grooves 40 are formed on the interior surfaces 34 of the side walls 30 and receive an edge portion of the conveyor belt 12 and form part of a guide for the belt.

The power module 20 and return or end module 23 have the same general configuration as the straight module. The power module includes a traditional motor and drive mechanism for moving the conveyor belt. The end module 23 includes a gear or groove connecting the belt grooves (both not shown) to return or redirect the conveyor toward the power module.

The straight connector assemblies 24 have the same side wall, cross member and belt support configuration as the straight module. The side walls of the straight connector assemblies 24 differ in that they preferably include an integrally molded coupler or plate 42, a portion of which overlies the side wall of the adjacent module or connector. The plate 42 has openings that receive traditional fasteners to secure the straight connector side wall to the adjacent side wall. The plate and fasteners form one possible fastening assembly.

The angular connector assemblies 26 have the same side wall, cross member, and belt support configuration as the straight connector. The main difference in the angular connector assemblies 26 and the straight connector assemblies 24 is that the side walls are curved at a predetermined angle to effect the angular change in the path of the conveyor. The angular connector side walls can even have the same plate 42 as the straight connector side walls.

It is worth noting that it is preferred that the plates 42 are integrally formed with both the straight and angular connector assemblies and that the conveyor is made from alternating module assemblies and connector assemblies. In this manner, the connector assemblies will typically have integrally formed therein all of the plates 42 needed to assemble the conveyor. However, separate plates 42, not integrally formed with the side walls, can be used to connect side walls of adjacent modules when no intervening connector assembly is used or if the connector assemblies do not have the plates integrally formed therein.

Figure 2:
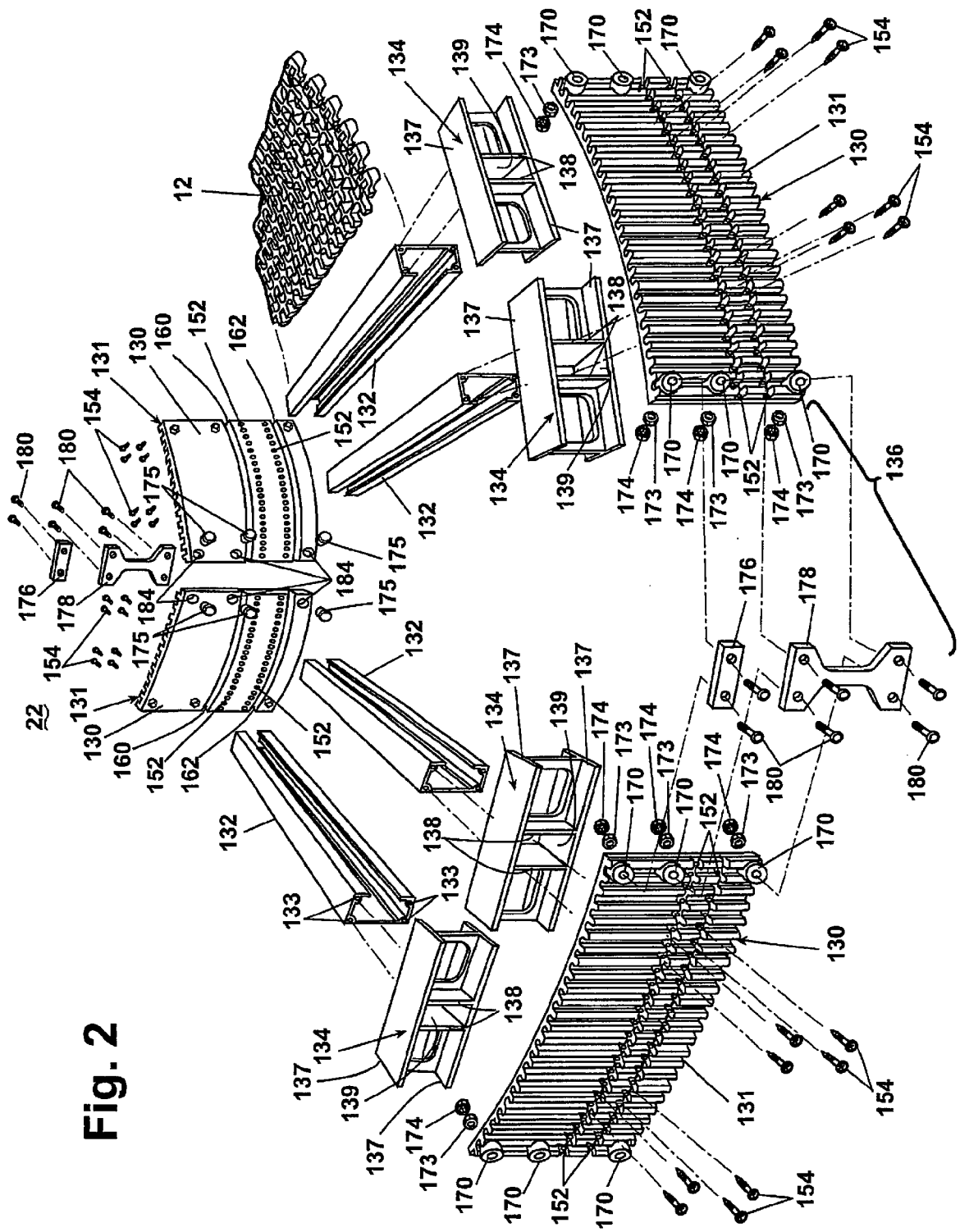
FIG. 2 is an exploded view of the radius turn module shown in FIG. 1 according to the invention.
Figure 3:
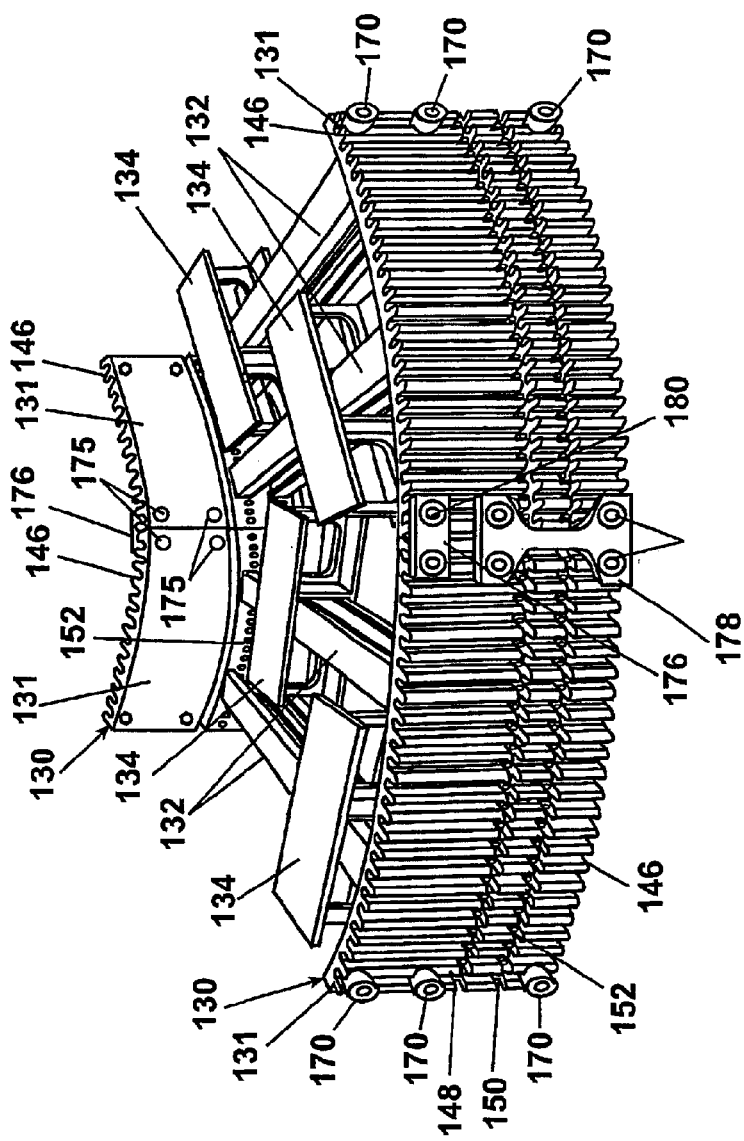
FIG. 3 is a perspective view of the radius turn module shown in FIG. 2 in assembled form.
Figure 4:
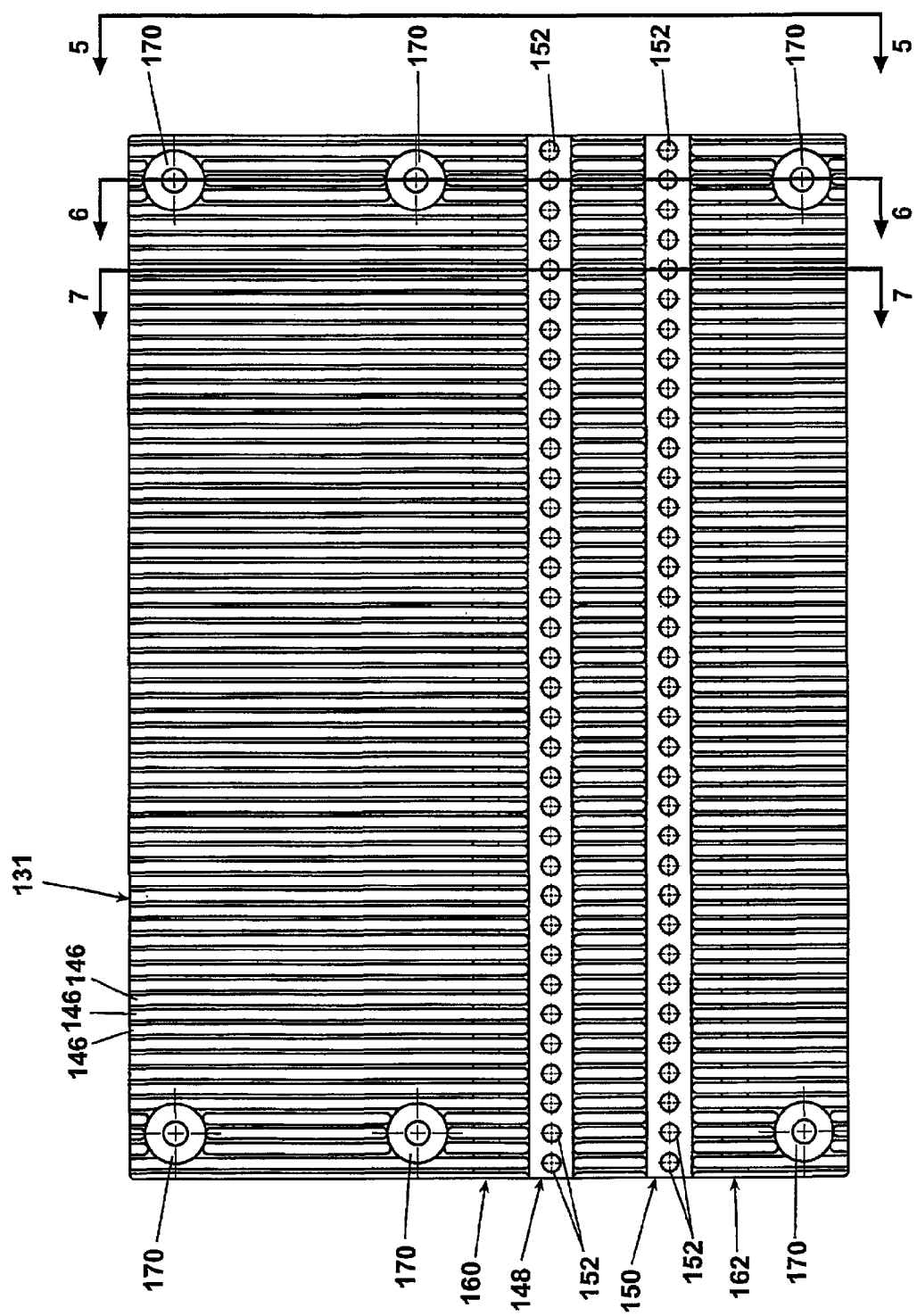
FIG. 4 is a plan view of a side wall of the radius turn module.
Figure 5:
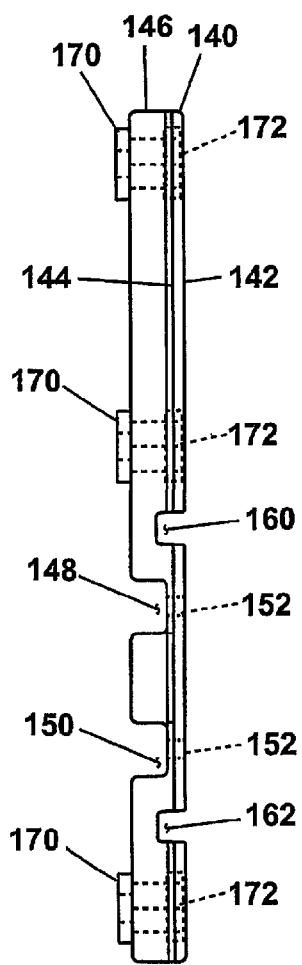
FIG. 5 is an end view taken along line 5—5 of FIG. 4.
Figure 6:
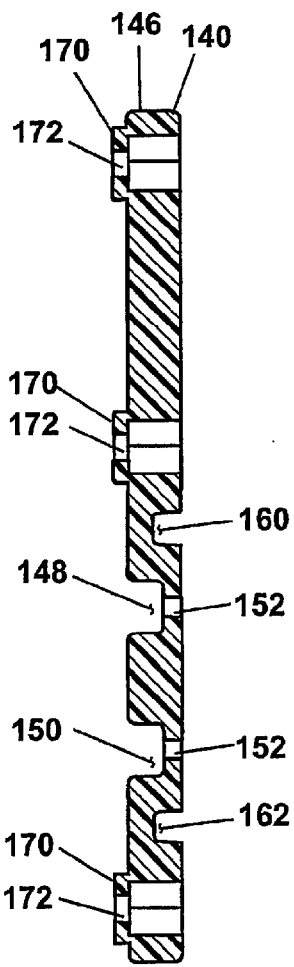
FIG. 6 is a sectional view taken along line 6—6 of FIG. 4.
Figure 7:
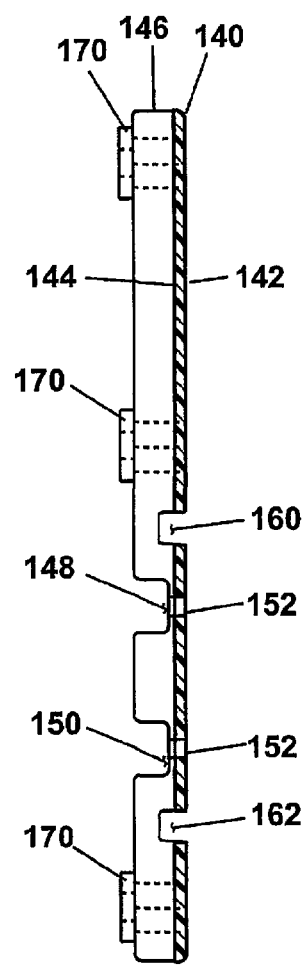
FIG. 7 is a sectional view taken along line 7—7 of FIG. 4.

FIGS. 2 and 3 illustrate in greater detail the radius turn module 22 according to the invention. The radius turn module 22 comprises opposing and spaced inner wall 129 and outer wall 130 that form the sides of the radius turn. The inner and outer wall each define their own arc, which collectively form the angle of the turn. The inner wall and outer wall are each formed from multiple side walls 131.

The side walls are connected by cross members 132. The cross members preferably have a C-shaped cross section and tapped openings 133 formed in each end thereof. The cross members 132 are different than the cross members disclosed in the Chambers '531 patent. However, the cross members 132 would also be suitable for connecting the sides walls of the other modules and connector assemblies of the conveyor.

Belt supports 134 are mounted to the cross members 132 and provide a surface on which the belt 12 rests. The belt supports preferably comprise opposing rails 137 connected by spaced cross members 138, which define an opening 139. The opening 139 is preferably sized to snuggly receive a cross member 132 and thereby mount the belt supports 134 to the cross member 132.

The ends of the side walls 131 are connected by fastening assemblies 136. The side walls 131 of the radius turn module 22 differ from the prior side walls in that they are made from a material and have a construction that permits their flexing or bending for shaping the assembled side walls 130 into an arc corresponding to the desired radius of curvature for the radius turn.

Referring to FIGS. 4–7 in particular and to FIGS. 2 and 3 generally, the side walls 131 comprise a generally planar base or body 140 having an elongated and rectangular profile, with the longer dimension defining a longitudinal axis and the shorter dimension defining a transverse axis. Preferably, the longitudinal axis is orthogonal to the transverse axis. As used herein the terms "longitudinal bending" refers to bending the side wall about the transverse axis and "transverse bending" refers to bending the side wall about the longitudinal axis.

The base defines an inner surface 142 facing the belt 12 when assembled and an outer surface 144 opposite the inner surface 142. The thickness of the planar base 140 in combination with the material used to make the base 140 is selected to permit the longitudinal bending of the base 140 about the transverse axis of the base 140. Preferably, the base is approximately ¼" thick, with a height of 12" and a length of 17-½". Suitable materials for the base include high density polyethylene (HDPE) or polypropylene (HDPP), with or without additives.

A series of vertically or transversely oriented strengthening ribs 146 extend away from the outer surface 144 of the planar base 140. The ribs preferably extend approximately ½" away from the outer surface 144 and have a tapered profile to permit the molding of the side wall 130. The ribs 146 resist transverse bending. The height (the distance the ribs extend from the base outer surface) of the rib 146 can vary depending on the desired degree of transverse bending relative to the longitudinal axis. The thickness of the base 140 between the ribs can be less than the overall base thickness. Depending on the specific implementation or application, it is possible that the vertical ribs 146 are not needed at all.

The vertical ribs 146 are broken at two locations to effectively define two parallel and longitudinally oriented channels 148 and 150, which provide unobstructed access to the outer surface 144 of the base 140. A plurality of cross member holes 152 extend through the base 140 along the channels 148, 150. The cross member holes 152 are used to connect the cross members 132 directly to the base 140 by use of a suitable mechanical fastener, such as a screw 154. A threaded bolt and other traditional fasteners can be used in place of the screw.

A pair of belt grooves 160, 162 are formed in the base 140. The belt grooves 160, 162 open into the inner surface of the base 140. The belt grooves 160, 162 are sized to receive an edge of the endless belt 12 for the conveyor. One of the grooves 160, 162 holds the portion of the belt carrying the product along the modular conveyor and the other of the grooves 160, 162 will house the return portion of the belt.

In the preferred embodiment, the grooves 160, 162 are of a sufficient depth so that they extend entirely through the planar base 140 and into a portion of the ribs 146. If the ribs 146 are not needed to control transverse bending, then the base 140 can be made thicker to accommodate the necessary depth of the grooves 160, 162 for the belt as long as the desired longitudinal bending is retained. Otherwise, the ribs 146 can be provided at the portions of the base 140 to span the grooves 160, 162 to form a portion of the grooves 160, 162.

A series of embossments 170 are provided on the side walls 131, preferably at the corners. Each of the embossments has an opening 172 sized to receive a nut 173 and hex-shaped jam plug 174. The embossments 170 are sized to be received within corresponding openings in either a lateral coupler 176 or a vertical coupler 178. The lateral coupler is similar to the coupler 42 for the connection assemblies. Mechanical fasteners 180 extend through the lateral and/or vertical couplers 176, 178 and thread into the nut 173 to secure adjacent side walls 131.

The side walls 131 are preferably injection molded resulting in the base 140, ribs 146, and embossment 170 all being formed as a single or integral piece. To reduce the need for multiple molds, the side walls 131 are preferably made of a given or modular length, even though it is well within the scope of the invention to manufacture the side walls 131 of varying lengths. To reap the advantages associated with a modular conveyor system it is preferred that the side walls 131 be made of the same length.

Given that the radius turn module 22 can be configured to accommodate various turn angles ranging from just off of 0° up to approximately 360°, it is necessary that arc length will vary for the inner and outer walls. With the side walls 131 having a preferred fixed length, it will be necessary in many circumstances and applications to cut the side walls 131 of one or both of the inner and outer walls to a length necessary to scribe the desired arc. Advantageously, the side walls 131 are especially designed for cutting. The material used to make the side walls 131 aids in their cutting. Also, the ribs 146 and the resultant spaces between adjacent ribs form a natural groove along which the side walls 131 can be cut.

Figure 8:
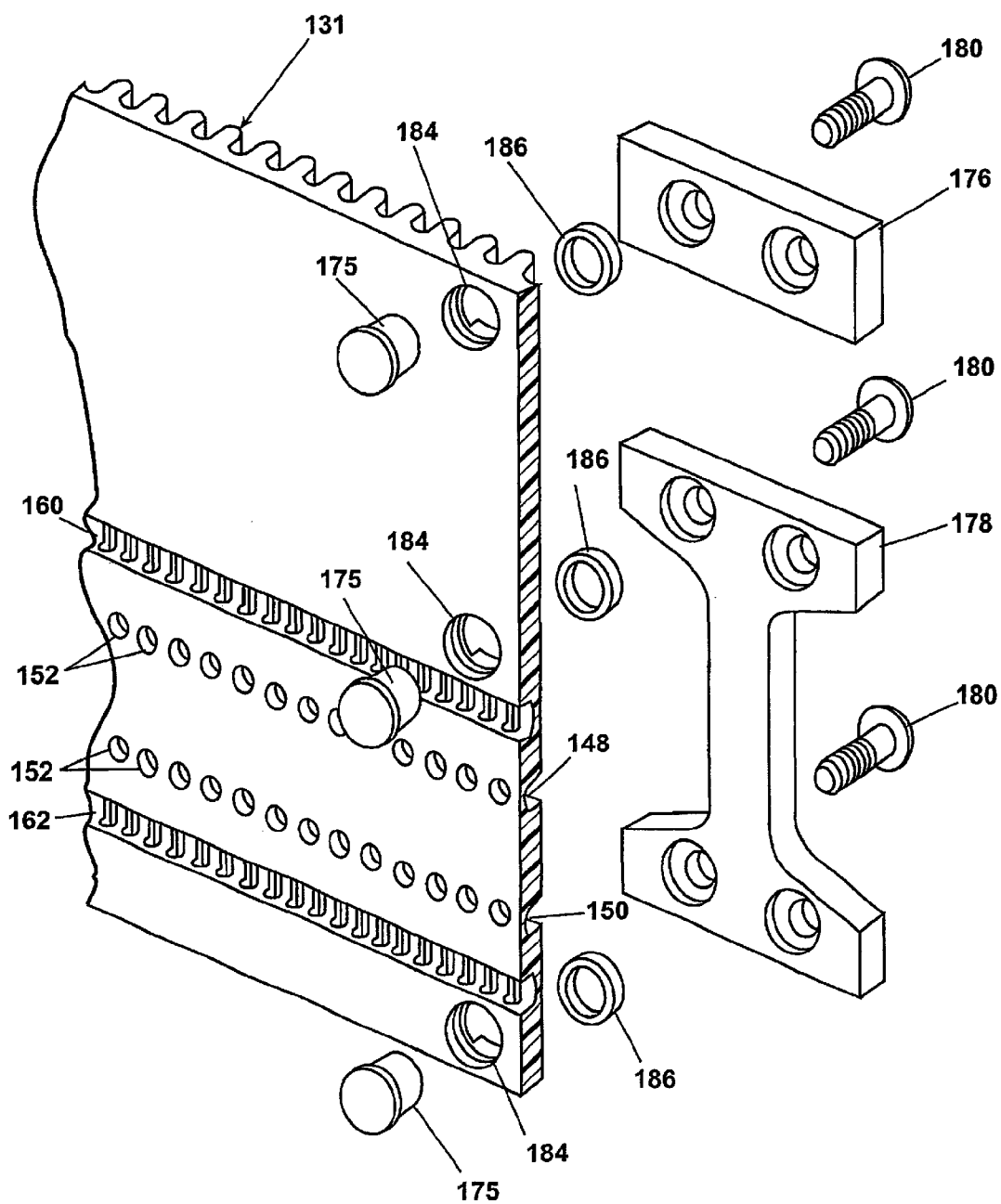
FIG. 8 is an enlarged perspective view of the connector for a cut side wall for the radius turn module shown in FIGS. 2 and 3.

Referring to FIG. 8, in most cases, the cutting of the standardized length side wall removes the embossments 170 on one edge of the side wall 131. Therefore, under these circumstances, the fastening assembly must be able to accommodate the removal of the embossments 170 and preferably make such an accommodation while still working with the lateral or vertical fastener 176, 178 to secure the cut side wall with a regular side wall or another cut side wall to take advantage of the modular nature of the conveyor.

When no embossment 170 is available at the desired connection location, an opening 184 is formed in the side wall and extends through the base 140 and ribs 146. The opening 184 is shaped to receive a tapped fillet 175. Since the modified or cut side wall 131 does not include an embossment 170, the opening 184 is countersunk to receive a bearing ring 186 that functions as the embossment 170. The combined tapped fillet 175 and the bearing ring 186 effectively form the combined embossment 170 and tapped fillet of an uncut side wall. The lateral and vertical couplers 176, 178 can mount to the tapped fillet 175 and the bearing ring 186 in the same manner as they mount to the embossment 170 and tapped fillet 175.

To assemble the radius turn module 22, side walls 131 are assembled to form the opposed inner and outer sides for the desired turn. Initially, the degree of turn for the radius turn module is determined, enabling the calculation of the arc length for the inner and outer side walls. The corresponding number of side walls 131 to obtain an inner or outer wall of the desired arc length are then selected and assembled together using the nut 173 and jam plug 174 in combination with the embossments 170 and tapped fillets 175 and bearing rings 186, if any of the side walls 131 must be cut to obtain the desired arc length.

The number of cross members needed to suitably connect the inner and outer side walls for a particular turn are determined along with the corresponding number of belt supports 134. The belt supports 134 are then mounted to the cross members 132 by inserting the cross members 132 into an opening 139 in the belt support 134. The subassembly of the cross members 132 and belt supports 134 is used to connect the inner and outer side walls of the radius turn module.

Although not necessary, it is preferred that the cross members 132 initially be connected near the corresponding ends of each side wall to initially define the turn. Afterwards, cross members 132 can then be placed between the side walls where desired. All of the cross members 132 are connected to the side walls by threading fasteners 154 through the cross beam openings 152 and into openings 139 formed in the end of each cross member 132.

Once the radius turn module 22 is completely assembled, it is connected to the other modules of the modular conveyor 10 by using the same nut 173 and jam plug 174 and embossment 170 in combination with the lateral or vertical couplers 176, 178. The belt is entrained through the belt grooves 160, 162 once the modules of the modular conveyor 10 are assembled.

Since the inner arc of the radius turn module has a shorter length than the outer arc, the belt must be capable of accommodating the different travel lengths for the inner and outer arcs. A suitable belt is one capable of lengthening or shortening when encountering the radius turn. Such a belt is a radius belt sold by Intralox of Harahan, La. The radius belt is illustrated in FIG. 2 and comprises multiple interlocked strips capable of relative movement. As the radius belt moves around a radius turn, the ends of the strips adjacent the shorter arc move toward each other to reduce the length of the belt along the shorter arc to prevent the belt from jamming within the grooves.

It should be noted that the side walls 131 of the radius turn module 22 are asymmetrical relative to the channels 148, 150, resulting in one of the longitudinal edges of the side wall being spaced a greater distance from the belt than the other longitudinal edge. Since the side walls 31 can be oriented so that either of the longitudinal edges is positioned above or below the belt, the more greatly spaced portion can be used to extend the height of the side wall of the belt in one orientation or extend farther below the belt in another orientation. If the greater spaced portion extends above the belt, it will define side walls 131 having a greater height and being more suitable to retain larger objects. If the greater side wall portion extends below the belt, it is preferred that the side wall portion be used to mount the support member 16. If there is no desire to have a greater extending portion, the excess or unwanted portion can be cut away.

Figure 9:
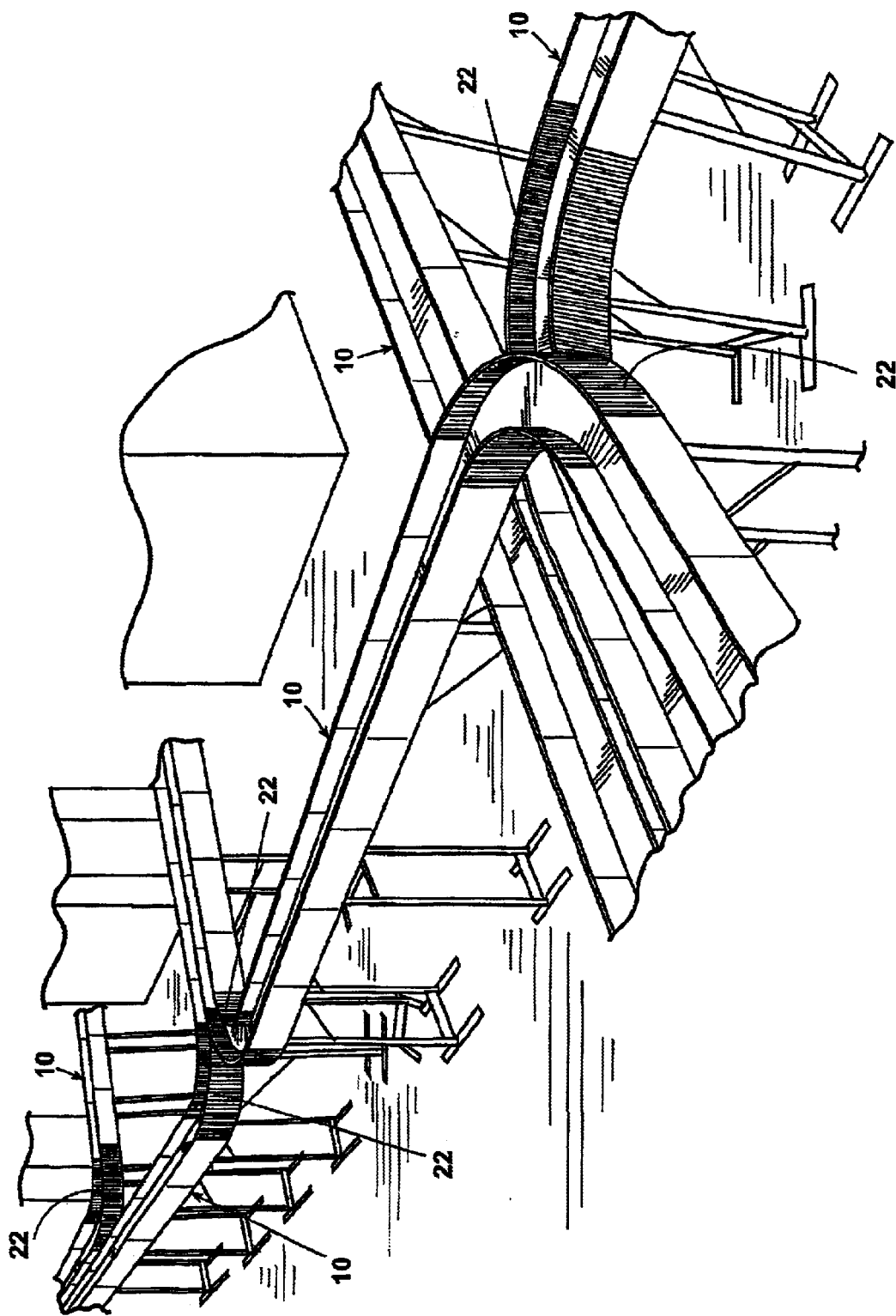
FIG. 9 is a perspective view of a multiple-conveyor application incorporating the modular conveyor, including multiple radius turn modules, according to the invention.

FIG. 9 schematically illustrates a complex multi-conveyor application of the conveyor 10 according to the invention and incorporating several radius turn modules 22. FIG. 9 is useful in understanding the substantial advantages and benefits that derive from a modular conveyor that includes a modular radius turn. All of the components of the of the modular conveyor 10, including the radius turn module 22, can be designed on a computer and then prepared for shipping without the need to pre-assemble the components to insure the conveyor works as is required with custom conveyors. Additionally, the modularity of the components, including the fact that the radius turn module shares many element with the other modules, results in the entire conveyor being shipped in a traditional shipping container having dimensions of 54"×54"×30". If the conveyor 10 is relatively large multiple shipping containers must be used, but standard containers can always be used. The ability to ship all of the components comprising the modules and connections assemblies in standard containers greatly reduces the shipping cost.

These advantages are further enhanced in that the side walls of the radius turn module can also be shipped in the same manner because in their normal state they correspond in size to the other components, especially the side walls of the straight module. Unlike with prior custom or stand-alone radius turns, it is not necessary to specially ship or ship assembled the radius turn module of the invention regardless of the length of the arc of the inner and outer walls of the radius turn module because the inner and outer walls are formed from modular side walls, which can be bent into the desired arc.

While the invention has been described in connection with certain specific embodiments thereof, it is to be understood that the drawing description is by way of illustration and not of limitation, and that reasonable variation and modification are possible within the scope of the forgoing description of the invention without departing from the spirit of the invention. For example, while it is preferred that the side walls 131 have a rectangular shape and the longitudinal and transverse axes are orthogonal to each other, such is not necessary. It is possible that the side walls 131 have a parallelogram shape where the corner angles are not 90 degrees. Such a side wall could be used to effect not only a radius turn, but a radius turn in combination with an incline or decline in the belt path, eliminating the need for an angular connector.

What is claimed is:

1. A conveyor assembly comprising:
   a plurality of modular assemblies each of which comprises a pair of spaced side walls, spaced cross members connecting the side walls, and belt supports mounted to the cross members;
   fastener assemblies for joining the modular assemblies to each other to form an assembled conveyor frame with a defined belt path between the spaced side walls; and
   an endless conveyor belt having a length to fit in the defined belt path of the assembled conveyor frame; and
   wherein at least one of the modular assemblies is a radius turn module having bendable side walls that are bendable through an arc about an axis perpendicular to the belt path to define at least one radius turn of the belt path.

2. The conveyor assembly of claim 1 wherein the bendable side walls have a longitudinal axis that is generally parallel to the belt path and the bendable side walls comprise a plurality of ribs positioned on the side walls to resist bending about the longitudinal axis.

3. The conveyor assembly of claim 2 wherein the bendable side walls have opposing inner and outer surfaces connected by a peripheral edge and the inner surface faces the belt path when the conveyor frame is assembled and the ribs extend from the outer surface.

4. The conveyor assembly of claim 2 wherein the plurality of ribs are spaced relative to each other along the outer surface of the side walls.

5. The conveyor assembly of claim 2 wherein the bendable side walls have reduced thickness portions located between at least some of the ribs for use in guiding cutting of the side walls to adjust the length of the side walls.

6. The conveyor assembly of claim 2 wherein the ribs are generally orthogonal to the longitudinal axis.

7. The conveyor assembly of claim 2 wherein the ribs are located on at least an upper portion of the side walls.

8. The conveyor assembly of claim 7 wherein the bendable side walls have a height orthogonal to the longitudinal axis that is greater than the side walls of the modules without bendable side walls.

9. The conveyor assembly of claim 1 wherein the bendable side walls further comprise an embossment having an opening and the embossment forms part of the fastener assemblies.

10. The conveyor assembly of claim 9 wherein the embossment opening is tapped and the fastener assemblies further comprise a plate for spanning between the embossment and adjacent side walls and a threaded fastener for receipt though an opening in the plate and within the tapped opening.

11. The conveyor assembly of claim 10 wherein at least one of the fastener assemblies further comprise a threaded nut for receipt within the embossment opening for forming the tapped opening.

12. The conveyor assembly of claim 9 wherein the embossments is integrally molded with the side wall.

13. The conveyor assembly of claim 1 wherein the bendable side walls have a groove, with an open top located on the inner surface and parallel with the belt path, for receiving an edge portion of the belt and keeping the belt aligned with the belt path.

14. The conveyor assembly of claim 1 and further comprising a plurality of modular connectors for joining the modular assemblies end-to-end, the modular connectors comprising side walls, cross members and belt supports.

15. The conveyor assembly of claim 14 wherein the modular connectors comprise at least one of a straight connector and an angular connector.

16. The conveyor assembly of claim 14 wherein the side walls of the modular connectors have an upper and lower edge and the sum of the lineal length of the upper and lower edges is equal for all of the modular connectors.

17. The conveyor assembly of claim 1 wherein the at least one radius turn comprises an inner wall formed by a bendable side wall and an outer wall formed by a bendable side wall for forming the inner wall in an inner arc and the outer wall in an outer arc having a radius of curvature greater than the inner arc.

18. The conveyor assembly of claim 17 wherein the bendable side walls forming the inner and outer wall have a uniform length.

19. The conveyor assembly of claim 18 wherein at least one of the bendable side walls forming the inner or outer walls is formed by a bendable side wall that is cut to a length shorter than the uniform length.

20. The conveyor assembly of claim 19 wherein at least one of the inner and outer arcs is formed by multiple bendable side walls.

21. The conveyor assembly of claim 20 wherein at least one of the multiple bendable side walls is of the uniform length.

22. The conveyor assembly of claim 1 wherein the endless conveyor belt is adapted to entrain the entire belt path.

23. The conveyor assembly of claim 22 wherein the modular assemblies further comprise at least one of a motor assembly, a straight assembly, and a belt return assembly.

24. The conveyor assembly of claim 1, wherein the each of the bendable side walls of each modular assembly are unitary.

25. The conveyor assembly of claim 1, wherein the bendable side walls are resilient.

26. A radius turn module for a modular conveyor assembly, the radius turn module comprising:
a pair of spaced bendable side walls defining a portion of a belt path therebetween;
spaced cross members connecting the side walls;
belt supports mounted to the cross members for supporting a conveyor belt between the spaced side walls;
wherein the spaced side walls are bendable through an arc about an axis perpendicular to the belt path to define at least one radius turn of the belt path.

27. The radius turn module of claim 26 wherein the side walls have a longitudinal axis that is generally parallel to the belt path and the side walls comprise a plurality of ribs positioned on the side walls to resist bending about the longitudinal axis.

28. The radius turn module of claim 27 wherein the side walls have opposing inner and outer surfaces connected by a peripheral edge and the inner surface faces the belt path and the ribs extend from the outer surface.

29. The radius turn module of claim 27 wherein the plurality of ribs are spaced relative to each other along the outer surface of the side walls.

30. The radius turn module of claim 27 wherein the side walls have reduced thickness portions located between at least some of the ribs for use in guiding cutting of the side walls to adjust the length of the side walls.

31. The radius turn module of claim 27 wherein the ribs are generally orthogonal to the longitudinal axis.

32. The radius turn module of claim 27 wherein the ribs are located on at least an upper portion of the side walls.

33. The radius turn module of claim 26 wherein the side walls further comprise an embossment having an opening and the embossment can form part of a fastener assembly to join the radius turn module with another module in the conveyor.

34. The radius turn module of claim 33 wherein the embossment opening is tapped.

35. The radius turn module of claim 33 wherein the embossments is integrally molded with the side wall.

36. The radius turn module of claim 26 wherein the side walls have a groove with an open top located on an inner surface of the side wall and parallel with the belt path, and sized to receive an edge portion of a conveyor belt to keep the belt aligned with the belt path.

37. The radius turn module of claim 26, wherein the side walls are resilient.

38. The radius turn module of claim 26, wherein the radius of curvature is constant for the portion of the belt path defined by the spaced side walls.

39. The radius turn module of claim 26 wherein the radius turn comprises an inner wall comprising one of the side walls and an outer wall comprising the other of the walls, wherein the inner wall is spaced from the outer wall and the inner wall defines an inner arc and the outer wall defines an outer arc having a radius of curvature greater than the inner arc.

40. The radius turn module of claim 39 wherein the side walls forming the inner and outer arcs have a uniform length.

41. The radius turn module of claim 40 wherein at least one of the side walls forming the inner or outer walls is formed by a wall that is cut to a length shorter than the uniform length.

42. The radius turn module of claim 41 wherein at least one of the inner and outer walls is formed by multiple side walls.

43. The radius turn module of claim 42 wherein at least one of the multiple side walls is of the uniform length.

44. The radius turn module of claim 26 wherein the side walls are formed by bending straight sided side walls into their respective arcs.

45. The radius turn module of claim 26 wherein the bendable side walls have a height orthogonal to the longitudinal axis that is greater than the side walls of the modules without bendable side walls.

46. A method for assembling a conveyor comprising:
 a plurality of modular assemblies each of which comprises a pair of spaced side walls, a cross member connecting the spaced side walls, and a belt support mounted on the cross member and forming at least a portion of a belt platform, with at least one of the modular assemblies comprising first and second bendable side walls having an elongated body with a longitudinal axis;
 fastener assemblies joining the modular assemblies to each other to form an assembled conveyor frame with a defined belt path;
 an endless conveyor belt disposed within the belt path and supported by the belt supports; and
 the method comprising:
  bending the first bendable side wall into a radius of curvature corresponding to an inner arc to form at least a portion of the inner side wall;
  bending the second bendable side wall in a radius of curvature corresponding to the outer arc to form at least a portion of the outer side wall;
  securing at least one cross member between the first and second bendable side walls; and
  securing the first and second bendable side walls to the side walls of any adjacent modular assemblies.

47. The method of claim 46 and further comprising severing the bendable side wall to form an upper edge that is at a reduced height at least along a portion of the bendable side wall.

48. The method of claim 47 wherein the severed upper edge is generally parallel to the longitudinal axis.

49. The method of claim 46 and further comprising severing at least one of the first and second bendable side walls in a direction generally orthogonal to the longitudinal axis to adjust the length of the at least one of the first and second bendable side walls and forming a cut edge on the body thereof.

50. The method of claim 49 wherein in the severed side wall has a length so that the first and second arcs span the same angle.

51. The method of claim 49 and further comprising the securing of the cut edge to a side wall of an adjacent module by fastening a plate to the cut edge and the side wall of an adjacent module with fasteners.

52. The method of claim 51 and further comprising forming a tapped opening in the body near the cut edge and threading a fastener through the plate and into the tapped opening to secure the plate thereto.

53. The method of claim 52 and further comprising forming a plug opening in the body near the cut edge and inserting a plug having a tapped opening within the plug opening to form the tapped opening.

* * * * *

UNITED STATES PATENT AND TRADEMARK OFFICE
CERTIFICATE OF CORRECTION

PATENT NO. : 6,705,461 B2
DATED : March 16, 2004
INVENTOR(S) : Kuharevicz et al.

It is certified that error appears in the above-identified patent and that said Letters Patent is hereby corrected as shown below:

Column 11,
Line 30, "the embossments is" should read -- the embossment is --

Column 12,
Line 47, "the embossments is" should read -- the embossment is --
Line 60, "the other of the walls" should read -- the other of the side walls --

Column 13,
Line 3, "formed by a wall" should read -- formed by a side wall --
Line 19, "pair of spaced side wails" should read -- pair of spaced side walls --

Signed and Sealed this

Twenty-seventh Day of July, 2004

JON W. DUDAS
*Acting Director of the United States Patent and Trademark Office*